Patented Nov. 18, 1924.

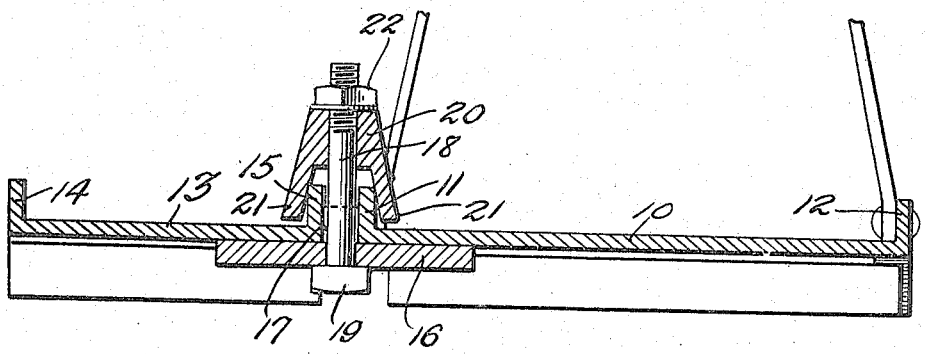
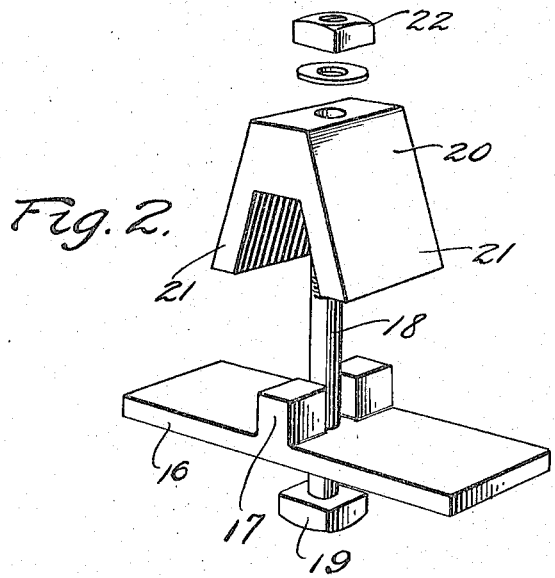

1,515,828

UNITED STATES PATENT OFFICE.

DENNIS R. BRIGLIN, OF NAPLES, NEW YORK, ASSIGNOR TO CLYDE M. FORD, OF DEARBORN, MICHIGAN.

EXTENSION-RIM FASTENER.

Application filed July 26, 1922. Serial No. 577,709.

*To all whom it may concern:*

Be it known that I, DENNIS R. BRIGLIN, a citizen of the United States, residing at Naples, in the county of Ontario, State of New York, have invented certain new and useful Improvements in Extension-Rim Fasteners; and I do hereby declare the following to be a full, clear, and exact description of the invention, such as will enable others skilled in the art to which it appertains to make and use the same.

This invention relates to new and useful improvements in tractor wheels, and particularly to extension rims and means for attaching the same to the wheels.

The principal object of the invention is to provide a novel and improved means for attaching an extension him to a tractor wheel without the necessity of boring a numbers of bolt holes in the rim and the extension.

Another object is to provide a fastening device by means of which the extension rim can be firmly clamped to the tractor wheel rim and be firmly held against accidental displacement.

Other objects and advantages will be apparent from the following description when taken in connection with the accompanying drawing.

In the drawing:

Figure 1 is a vertical transverse sectional view through the rim of a tractor wheel with an extension rim attached thereto by means of the novel fastening means.

Figure 2 is a perspective view of one of the fastening means removed from the wheel.

Referring particularly to the accompanying drawing, 10 represents the rim of a tractor wheel which has the inwardly extending flanges 11 and 12 Disposed outwardly of the outer edge of the rim is the extension or auxiliary rim 13, the same having the similar flanges 14 and 15. As seen in the sectional view, it will be noted that the flanges 11 and 15 do not contact. Disposed transversely of the peripheral faces of the rims 10 and 13, at regularly spaced intervals around the wheel, are the metal plates 16, each of which has a transverse central angular rib 17 which is disposed between, and extends longitudinally of the flanges 11 and 15.

Disposed through the center of plate 16 and through the center of the rib 17 is a bolt 18, the same having its head 19 resting on the outer face of the plate 16 and with its shank extending inwardly beyond the inner edges of the flanges 11 and 15. Disposed on this inner portion of the shank of the bolt is a block 20 having the diverging legs 21 which bridge the flanges 11 and 15 of the rims 10 and 13. A nut 22 is engaged on the inner end of the bolt and bears against the block 20, so as to draw the plate 16 tightly against the outer faces of the two rims. Thus the rims are firmly clamped together and by reason of the engagement of the legs 21 with the flanges 11 and 15, the extension rim is held against any movement away from the rim 10.

Ordinarily an extension rim is attached to a tractor rim by boring holes in both the wheel rim and the extension and securing the rim and extension together by passing bolts through them. This requires considerable amount of work and a large number of bolts and plates, which renders it difficult and tedious to apply the rim or remove it. In the present construction the fastening means simply clamps the extension rim in its proper position with respect to the wheel rim, without making any openings or altering the form of the wheel rim. Thus the extension rim is capable of ready application to the wheel rim of any tractor wheel, and particularly that of a Fordson tractor.

What is claimed is:

1. The combination with a flanged rim of a tractor wheel and a flanged extension rim, of a plate disposed across the joint of the two rims, on the tread face thereof, and having a rib disposed between the rims, a clamping bolt disposed through the plate and between the rims, and means carried by the bolt and straddling the joint of the rims, and in frictional engagement with the remote sides of the adjacent flanges of the rims.

2. A tractor extension rim securing means comprising a plate adapted to lie transversely of the peripheral faces of the rims, said plate having a rib adapted to lie between the rims, a bolt disposed through the plate and between the rims, and a block on the bolt having diverging legs straddling the mutually adjacent flanges of the rims.

3. The combination with a marginally flanged tractor wheel rim and an extension rim having a marginal flange disposed adjacent the flange of the wheel rim, of a plate disposed across the joint of the rims and having a pair of transversely alined lugs extending from one wider face and engaged between the rims, the plate having an opening between the lugs, a bolt disposed through said opening and between the lugs and between the rims, and a block having a pair of diverging legs extended toward the rims and each leg frictionally and wedgingly engaging with a flange for holding the rims.

4. In combination, a wheel having a tread portion, an inwardly extending flange on said tread portion, an auxiliary tread member adjacent said first tread portion and having an inwardly extending flange thereon, a bolt extending between said flanges, a member secured by said bolt adapted to clamp said flanges and said treads together.

5. In combination, a wheel having a tread portion, an inwardly extending flange on said tread portion, an auxiliary tread member adjacent said first tread portion and having an inwardly extending flange thereon, a bolt extending between said treads and between said flanges, a member disposed on the outer end of said bolt against the outer portions of said tread and a somewhat V shaped member on the inner end of said bolt engaging the sides of said flanges and clamping said flanges and said rims together.

6. In combination, a pair of wheel treads having oppositely disposed radial flanges, a somewhat V shaped member engaging the outer sides of said flanges and means for exerting pressure upon said member to thereby clamp said flanges together.

7. An attaching lug for joining flanged extension rims to flanged wheels, comprising an outer member having an inwardly extending spacing lug adapted to be located between adjacent flanges of said extension rim and said wheel, an inner member having outwardly extending arms adapted to be positioned upon opposite sides of adjacent flanges of said extension rim and said wheel, and means for drawing said members towards each other.

In testimony whereof, I affix my signature, in the presence of two witnesses.

DENNIS R. BRIGLIN.

Witnesses:
CLAUDE E. COMSTOCK,
C. H. BOALS.